United States Patent Office 3,616,524

Patented Nov. 2, 1971

3,616,524

METHOD OF MAKING AN ARTICLE, CONSISTING AT LEAST SUPERFICIALLY OF COPPER, SUITABLE FOR THE CONNECTION BY MEANS OF SPOT WELDING

Johannes Wilhelmus Hendrikus Maria de Vries, Emmasingel, Eindhoven, Netherlands, assignor to U.S. Philips Corporation, New York, N.Y.

No Drawing. Filed Feb. 4, 1969, Ser. No. 796,574
Claims priority, application Netherlands, Feb. 9, 1968, 6801828
Int. Cl. B23k *31/02*
U.S. Cl. 29—492 2 Claims

ABSTRACT OF THE DISCLOSURE

A method of joining a metal article having a copper surface to another metal article by spot welding in which the copper surface is first oxidized to form cuprous oxide and then reduced in a hydrocarbon atmosphere to form a layer of carbon particles between copper particles.

The invention relates to a method of making an article, consisting at least superficially of copper, suitable for the connection to another metal article by means of spot welding.

With a view to the electrical conductivity and/or heat dissipation it is desirable in many cases to make an article of copper at least at its surface. A drawback is that such an article cannot be connected to other metal surfaces as such by means of spot welding owing to the great thermal conductivity and the low electrical resistance of the copper as a result of which during spot welding the heat evolution takes place mainly in the other metal and the copper article remains too cold so that poor adhesion is obtained between the surfaces.

It has been found that this drawback can be avoided by using the method according to the invention, in which the copper surface is first oxidized and then reduced by heating it in a hydrocarbon atmosphere and thus is covered with a carbon-containing layer.

It has been found that the carbon-containing layer in addition shows a good heat radiation as a result of its dark colour.

During oxidation a layer consisting of cuprous oxide ($Cu_2O$) which has satisfactory adhesion is formed at the surface. The oxidation to $Cu_2O$ may be effected by heating at 700–900° C. in a weakly oxidizing gas atmosphere, for example, consisting of a mixture of nitrogen, hydrogen, and air, and then cooling rapidly, for example, in a water bath. In the subsequent reduction in a hydrocarbon atmosphere, for example, consisting of acetylene gas ($C_2H_2$), the oxide is again converted into copper, carbon being deposited between the copper particles and a very strongly adhering black layer being formed according to the reaction:

$$Cu_2O+C_2H_2\rightarrow 2Cu+2C\downarrow+H_2O\uparrow$$

It has surprisingly been found that the copper article can now be connected to other metal articles without any objection by means of spot welding. It is now simply possible to use grid wires, grid rods and connection conductors of electrodes with contact pins, which consist wholly or partly of copper, since the dark carbon-containing layer can be provided on the copper surface before the conductors are processed to electrodes, so that the copper parts can be welded together afterwards.

It is known from U.S. Pats. Nos. 1,880,937 and 1,897,933 that readily adhering dark carbon layers, can be obtained on, for example, nickel articles by first oxidizing the nickel surface and then reducing it by heating in a hydrocarbon gas atmosphere and thus covering it with carbon, but in this case the welding problem plays no part since nickel can be welded as such.

Although the invention relates to articles which consist at least superficially of copper, the copper layer must at least have a thickness such that it is not entirely converted into oxide during oxidation. It is also desirable to carry out the oxidation in such manner that cuprous oxide ($Cu_2O$) and no cupric oxide ($CuO$) is formed, since the adhesion of the last-mentioned oxide layer is not so satisfactory. The ultimately obtained carbon-containing layer generally has a thickness of 1 to $2\mu$.

What is claimed is:

1. A method of connecting a metal article having a copper surface to another metal article comprising the steps of heating at about 700 to 900° C. the copper surface in a weakly oxidizing atmosphere consisting of a mixture of nitrogen, hydrogen and air to form a layer of cuprous oxide thereon, reducing the cuprous oxide layer in an atmosphere of a reducible hydrocarbon to deposit on said surface carbon between copper particles, and spot welding the so coated article to the other metal article.

2. A method as claimed in claim 1 in which the reducible hydrocarbon is acetylene.

References Cited

UNITED STATES PATENTS

| | | | |
|---|---|---|---|
| 392,158 | 10/1888 | Lemp | 117—106 D |
| 1,897,933 | 2/1933 | Guthrie et al. | 117—49 |
| 1,880,937 | 10/1932 | Elsey | 117—49 |
| 2,092,018 | 9/1937 | Quarnstrom | 117—46 CG |
| 2,092,557 | 9/1937 | Quarnstrom | 117—46 CG |
| 1,893,286 | 1/1933 | Iredell | 117—49 |
| 1,862,138 | 6/1932 | Elsey | 117—46 CG |
| 1,973,341 | 9/1934 | George | 29—488 |
| 3,089,234 | 5/1963 | Deevy | 29—488 |

WILLIAM D. MARTIN, Primary Examiner
M. SOFOCLEOUS, Assistant Examiner

U.S. Cl. X.R.

117—46, 49; 219—118